US008638209B1

(12) United States Patent
Oskroba et al.

(10) Patent No.: US 8,638,209 B1
(45) Date of Patent: Jan. 28, 2014

(54) TRAFFIC CONTROL BOARD MOUNT FOR VEHICLES

(75) Inventors: Shaun Oskroba, Fort Collins, CO (US); Ervin Weinmeister, Loveland, CO (US)

(73) Assignee: Super Vacuum Manufacturing Company, Inc., Loveland, CO (US)

( * ) Notice: Subject to any disclaimer, the term of this patent is extended or adjusted under 35 U.S.C. 154(b) by 941 days.

(21) Appl. No.: 12/698,329

(22) Filed: Feb. 2, 2010

(51) Int. Cl.

| | |
|---|---|
| ***B60Q 1/26*** | (2006.01) |
| ***G08G 1/095*** | (2006.01) |
| ***B60Q 1/00*** | (2006.01) |
| ***B60Q 1/52*** | (2006.01) |
| ***G08B 5/24*** | (2006.01) |
| ***G09F 21/04*** | (2006.01) |
| ***G09F 21/02*** | (2006.01) |
| ***G09F 7/00*** | (2006.01) |
| ***B60Q 1/124*** | (2006.01) |

(52) U.S. Cl.
USPC ........ 340/480; 340/907; 340/425.5; 340/472; 340/487; 340/468; 40/588; 40/590; 40/586; 40/601; 362/486; 362/233

(58) Field of Classification Search
USPC ........ 340/908.1, 472, 487, 468, 932.1, 425.5, 340/480, 905, 925, 928; 362/66, 70, 74, 362/233, 250, 427, 430; 40/588, 589, 590, 40/591, 601
See application file for complete search history.

(56) References Cited

U.S. PATENT DOCUMENTS

| | | | | |
|---|---|---|---|---|
| 1,743,535 A | | 1/1930 | Edmondson | |
| 2,694,573 A | | 11/1954 | Walker | |
| 2,899,540 A | | 8/1959 | Allmand et al. | |
| 3,292,322 A | | 12/1966 | Pfaff et al. | |
| 3,463,916 A | | 8/1969 | DeBella | |
| 3,569,690 A | | 3/1971 | Nelson | |
| 3,783,267 A | | 1/1974 | Thomas | |
| 3,813,536 A | | 5/1974 | Kempkes | |
| 28,041 A | | 6/1974 | Loffler et al. | |
| 3,881,169 A | * | 4/1975 | Malach | 340/906 |
| 3,949,218 A | | 4/1976 | Hayward | |
| 4,220,981 A | | 9/1980 | Koether | |
| 4,423,469 A | | 12/1983 | Zerlaut et al. | |
| 4,450,507 A | | 5/1984 | Gordin | |
| 4,488,209 A | * | 12/1984 | Gosswiller | 362/486 |
| 4,712,167 A | * | 12/1987 | Gordin et al. | 362/233 |
| 4,835,515 A | * | 5/1989 | McDermott et al. | 340/472 |
| 5,203,621 A | * | 4/1993 | Weinmeister et al. | 362/486 |
| 6,412,203 B1 | * | 7/2002 | Libhart et al. | 40/591 |
| 6,809,654 B2 | * | 10/2004 | Hudson | 340/907 |
| 8,319,662 B1 | * | 11/2012 | Bontemps et al. | 340/908 |
| 2002/0175830 A1 | * | 11/2002 | Hudson | 340/907 |
| 2006/0012487 A1 | * | 1/2006 | Gibson et al. | 340/815.45 |
| 2006/0267796 A1 | | 11/2006 | Oskroba et al. | |

* cited by examiner

*Primary Examiner* — Jennifer Mehmood
*Assistant Examiner* — Mirza Alam
(74) *Attorney, Agent, or Firm* — James R. Young; Cochran Freund & Young LLC

(57) ABSTRACT

A traffic control board assembly as a self-contained unit is provided for mounting in an emergency response vehicle in a manner that accommodates deployment of a traffic control board above the top surface of the emergency response vehicle in any desired angular orientation about a vertical axis for visibility from any direction in relation to the emergency response vehicle. When docked, the top cover on the traffic board provides a weatherproof cover. Manual input and programmed control of a liftable rotation assembly on which the traffic board is mounted facilitate convenient and simple operation. A motion signal indicative of the emergency response vehicle moving can prevent deployment of the traffic control board and/or initiate returning it to a docked or stowed position.

16 Claims, 13 Drawing Sheets

TRAFFIC CONTROL BOARD MOUNT FOR VEHICLES

BACKGROUND OF THE INVENTION

1. Field of the Invention

The present invention relates generally to traffic control devices, and more specifically to a vehicle-mounted traffic control board assembly for emergency vehicles.

2. Description of the Prior Art

Traffic control boards, also sometimes known as traffic flow control boards, are generally rectangular boards with a plurality of lights mounted in a pattern or configuration that is conducive to selective lighting to display traffic control information or arrows pointing either left, right, or both left and right to direct traffic temporarily around hazards, accident scenes, fires, natural and man-made disaster sites, construction or work zones, parade routes, and other areas where traffic needs to be diverted. Portable traffic control boards are often mounted on trailers or carts that can be towed to sites that need additional traffic flow directional controls or indicators, such as near road construction sites, accident sites, public events that draw extraordinarily large amounts of traffic, and the like. First responders, such as fire fighters, rescue personnel, police swat units, and the like often need to create traffic diversions or other traffic control measures immediately upon coming onto a scene without the benefit of traffic control boards, which diverts highly trained human resources to having to do traffic control when their skills may be needed urgently for rescue, first aid, medical care firefighting, policing, or other requirements, at least until portable traffic control boards and/or secondary response personnel can be brought to the scene or until the scene is stabilized or cleared for noinial traffic flow. Except for flares, rudimentary reflectors, and flashing lights that can be placed on the roadways or streets by the first responders, little in the way of equipment is available for first responders to deploy immediately, quickly, and easily at accident and other disaster sites to direct, divert, or control traffic in a manner that does not occupy or tie up any significant time of the first responders.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting. In the drawings.

DETAILED DESCRIPTION OF EXAMPLE EMBODIMENTS

Figure 1:
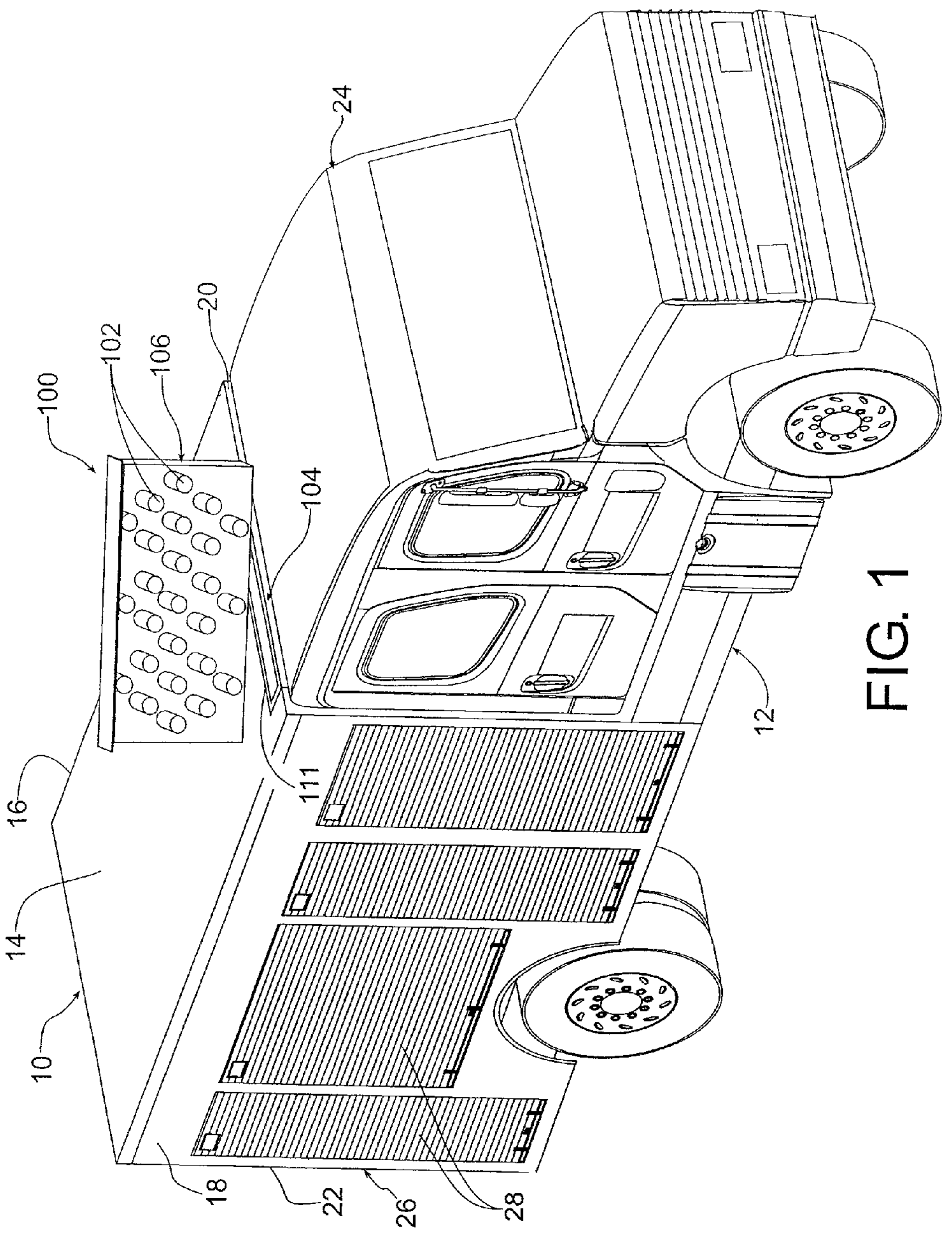
FIG. 1 is an isometric view of an example first responder emergency vehicle fitted with an example traffic control board assembly and illustrating a stowable traffic control board component of the assembly deployed over a top surface of the emergency vehicle.
Figure 2:
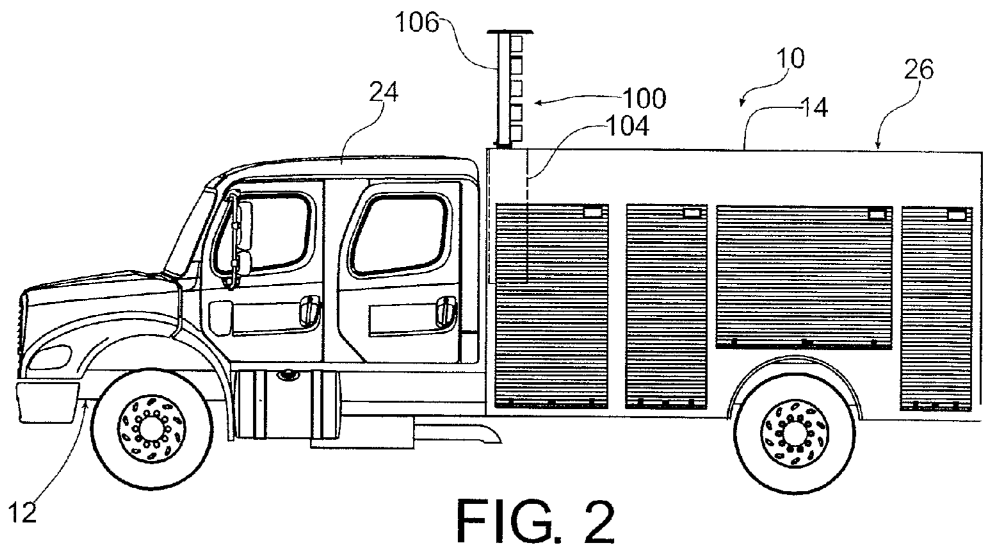
FIG. 2 is a side elevation view of an example first responder emergency vehicle fitted with an example traffic control board assembly, including a traffic control board deployed over a top surface of the emergency vehicle.

An example traffic control board assembly 100 is illustrated in FIGS. 1 and 2 mounted on a first responder emergency vehicle 10, such as a fire truck or rescue truck traffic control board assembly 100 is shown, for example, mounted in the front of the trunk body 26, and it is shown with the traffic control board 106 deployed out of its storage housing 104 in a raised position above the top surface 14 of the vehicle 10, where it can be seen easily by approaching traffic. In general, as shown in FIGS. 1 and 2, a typical first responder emergency vehicle 10 may include a truck body 26 mounted on a truck chassis 12 behind a cab 24. The truck body 26 of a typical first responder emergency vehicle 10 may comprise various compartments 28 for stowing equipment and supplies, pumps, tanks, tools, or other items for particular purposes (not shown). The example truck body 26 is shown with a left side 16, a right side 18, a top 14, a front 20, and a back 22. The example traffic control board assembly 100 is a compact configuration that can be mounted easily and conveniently in a variety of locations on, adjacent, or in a typical first responder emergency truck body 26 in a manner such that the traffic control board 106, when deployed, extends above the top surface 14 of the truck body 26 for easy visibility of the traffic control board 106 from any direction and, when stowed, can be flush with the top 14 of the truck body or lower. The traffic control board assembly 100 may have a plurality of signal forming devices 102, such as lamps, bulbs, light emitting devices, spatial light modulators, colored plates, or other devices that can be selectively turned on and off or otherwise activated or positioned individually or in groupings to emit or reflect light in various patterns that signal information or directions to oncoming traffic (e.g., to signal oncoming traffic to veer or bear left as illustrated, for example, in FIG. 4).

Figure 3:
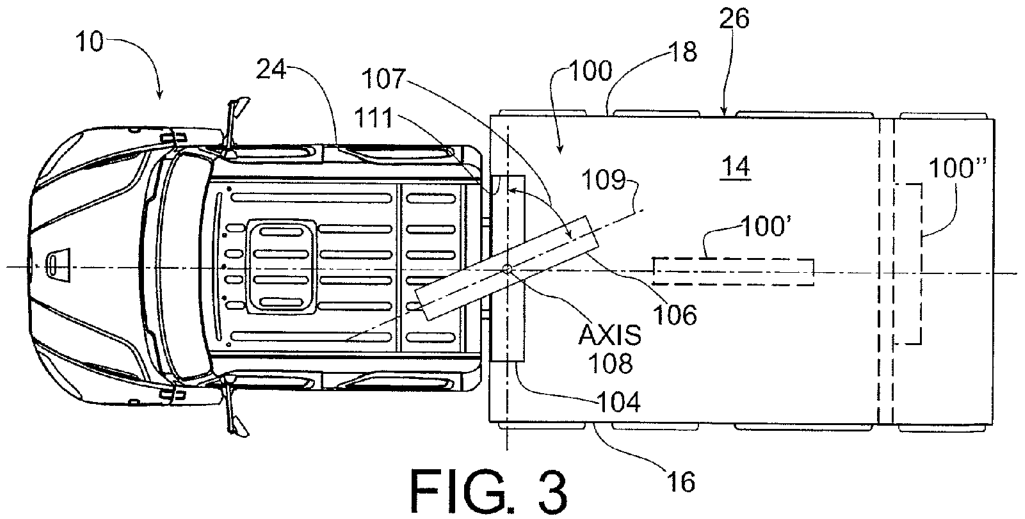
FIG. 3 is a top plan view of the emergency vehicle with the example traffic control board assembly of FIG. 2 illustrating the traffic control board rotated in relation to the emergency vehicle to make the traffic control display or signal visible from various angular orientations with respect to the emergency vehicle.
Figure 4:
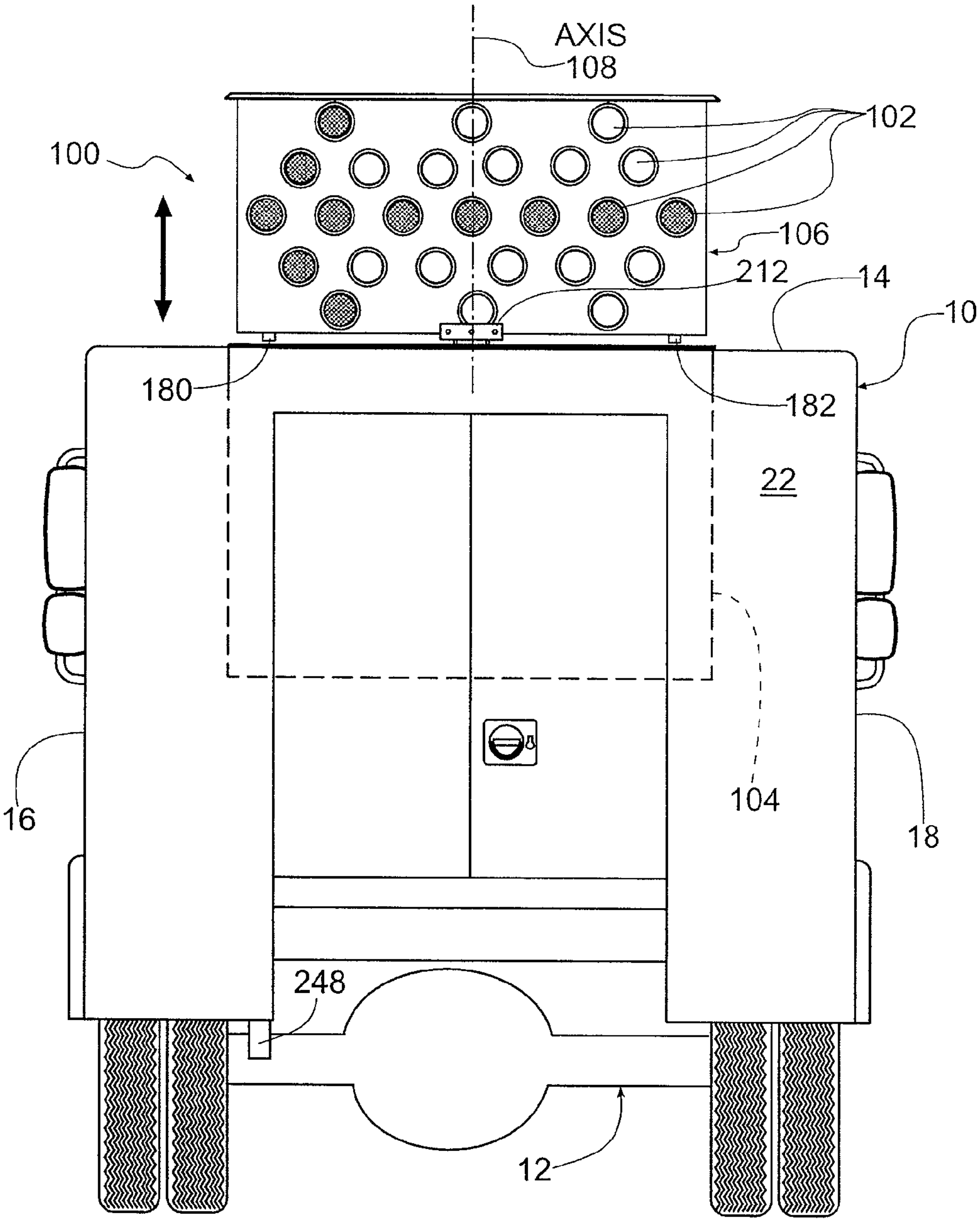
FIG. 4 is a rear elevation view of the first responder emergency vehicle fitted with the example traffic control board assembly of FIG. 1.
Figure 5:
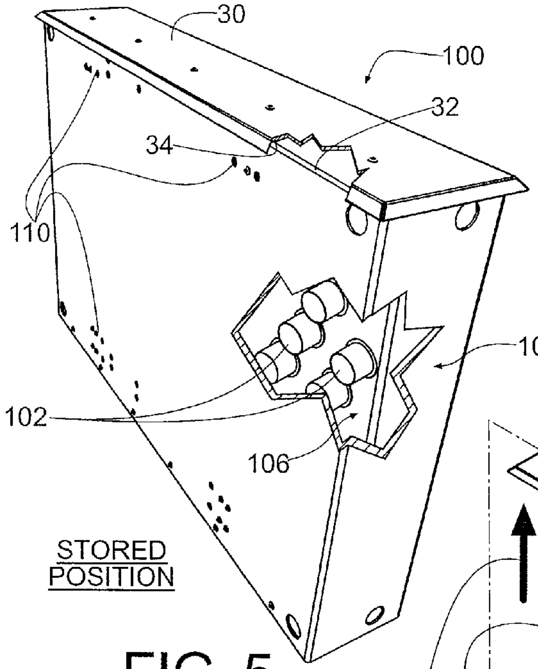
FIG. 5 is a perspective view of the example traffic control board assembly of FIG. 1 with the traffic control board stowed in a docked or storage position.
Figure 6:
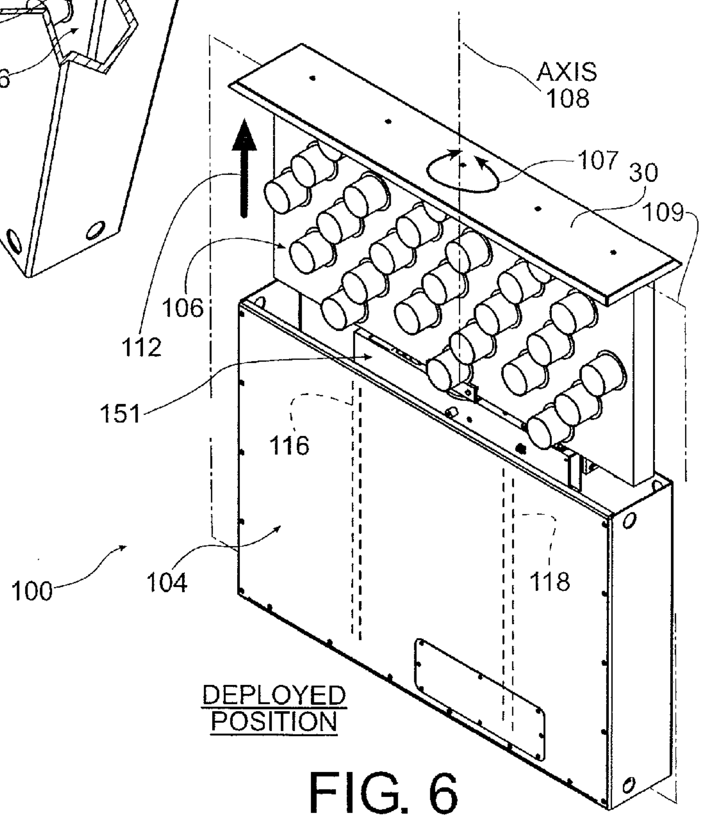
FIG. 6 is an isometric view of the example traffic control assembly with the traffic control board raised out of the storage position in the housing to a deployed position above the housing, which, when mounted on an emergency vehicle as shown in FIGS. 1 and 2, extends above the top surface of the truck body of the emergency vehicle.

The example traffic control board assembly 100 shown in FIGS. 1-7 includes a housing 104, a traffic control board 106 that can move vertically between a stored position (best illustrated in FIG. 4) and a deployed position (FIGS. 1-4), as indicated by the arrows 112 in FIGS. 4 and 6, and a liftable rotation assembly 151 (FIG. 6) for raising the traffic control board 106 out of the housing 104 to the deployed position above the truck body 26 and then rotating it to any desired angular orientation with respect to the emergency vehicle 10. The liftable rotation assembly 151 includes a display rotation mechanism 166 (FIGS. 7 and 8) that rotates the traffic control board 106 about a rotation axis 108, as indicated by the arrows 107 in FIGS. 3, 6, and 8, when it is in the deployed position. Therefore, the traffic control board 106 can be rotated to provide optimum visibility to traffic, regardless of any particular orientation of the first responder emergency vehicle 10. For example, if the emergency vehicle 10 is used in a blocking mode, i.e., parked diagonally in or partially in a traffic lane to shield accident victims or first responder personnel from on-coming traffic, the traffic control board 106 can be rotated with respect to the emergency vehicle 10, as illustrated in FIG. 1, to an orientation in which its display plane 109 (FIG. 3) is perpendicular to on-coming traffic for optimum visibility to the on-coming traffic.

As mentioned above, the traffic control board assembly 100 can be a self-contained unit, as shown, for example, in FIG. 5, that can be mounted in, on, or adjacent the truck body 26 in a manner that does not protrude from the truck body 26, as illustrated, for example, in FIG. 1, unless deployed. It also has a top cover 30 that closes the top of the housing 104 when the traffic control board 106 is stowed in the housing 104. The top cover 30 can extend over the upper edge or rim 32 of the housing 104 to shed rain or snow to the outside of the housing 104, and, if desired, it can include a seal 34 to interface in a sealing manner with the rim 32 to keep out dust, blowing rain or snow, spiders, insects, and the like. The seal 34 can be an O-ring seal, flat gasket, or any other conventional seal material.

Any of a variety of attachment accoutrements 110, for example, holes, bolts, or other fasteners, can be provided on or as part of the housing 104 for fastening the traffic control board assembly 100 to the truck body 26, as shown for example in FIGS. 1-3. A cutout or recession 111 can be provided in the truck body 10 to accommodate mounting the traffic control board assembly 100 with little or no protruding side, front, or top panels of the housing 104, as shown for example in FIGS. 1-3, or alternatively, for mounting the housing 104 on an outside surface of the truck body 26, as shown for example in FIG. 15.

Figure 7:
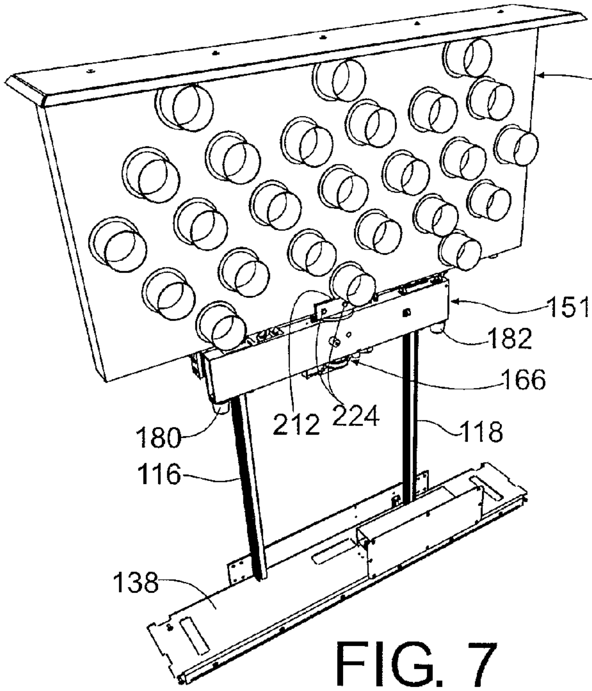
FIG. 7 is a perspective view of an example liftable and rotatable mounting assembly for supporting, lifting, and rotating the traffic control board without showing the housing in order to reveal the internal component and spatial relationships.
Figure 8:
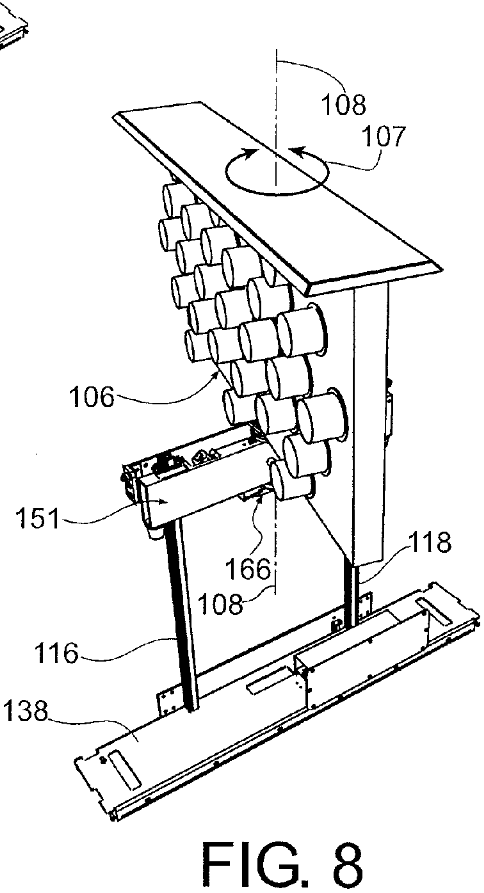
FIG. 8 is a perspective view similar to FIG. 7, but with the traffic control board rotated to a different orientation.

As mentioned above, the traffic control board 106 is mounted on a liftable rotation assembly 151, as shown in FIGS. 6-8, for deploying it above the top 14 of the truck body 10. For deployment, the liftable rotation assembly 151 first lifts the traffic control board 106 upwardly, as shown by the arrow 112 in FIG. 6. Then when the traffic control board 106 has been lifted enough to clear the housing 104 and top surface 14 of the truck body 10, as shown in FIG. 4, the liftable rotation assembly 151 can rotate the traffic control board 106 about the vertical axis 108, as indicated by the arrow 107 in FIGS. 3, 6, and 8, to any desired rotational (angular) orientation in relation to the emergency response vehicle 10, as illustrated in FIG. 1. Therefore, the rotatable traffic control board 106 can be rotated to project light emitted or reflected from the visual signal forming devices 102 in any direction, for example toward oncoming traffic, regardless of the position of the emergency response vehicle 10. In the example traffic control board assembly 100 shown in FIGS. 5 and 6, the top panel 30 is mounted on the top of the traffic control board 106 so that it moves up and down with the traffic control board 106. Therefore, lowering the traffic control board 106 back into the housing 104 results in closing the top of the housing 104 with the top panel or cover 30, as shown in FIG. 5. Of course, other cover apparatus could also be used.

In the example traffic control board assembly 100 shown in FIGS. 7 and 8, the liftable rotation assembly 151 is slidably or glidably mounted on a pair of parallel, vertical guide rails 116, 118 that are attached to, and extend upwardly from, a base panel 138. The base panel 138 can, but does not have to, be the bottom panel of the housing 104 (FIGS. 5 and 6). Essentially, the guide rails 116, 118 provide lateral stability and alignment to the liftable rotation assembly 151 and traffic control board 106 as the traffic control board 106 is being raised, lowered, or held in a deployed position and while the traffic control board 106 is either deployed or stowed, as described above. They also serve as struts to support the weight of the traffic control board 106 and of the liftable rotation assembly 151 during raising, deployment, and lowering of the traffic control board 106, as will be explained in more detail below.

Figure 9:
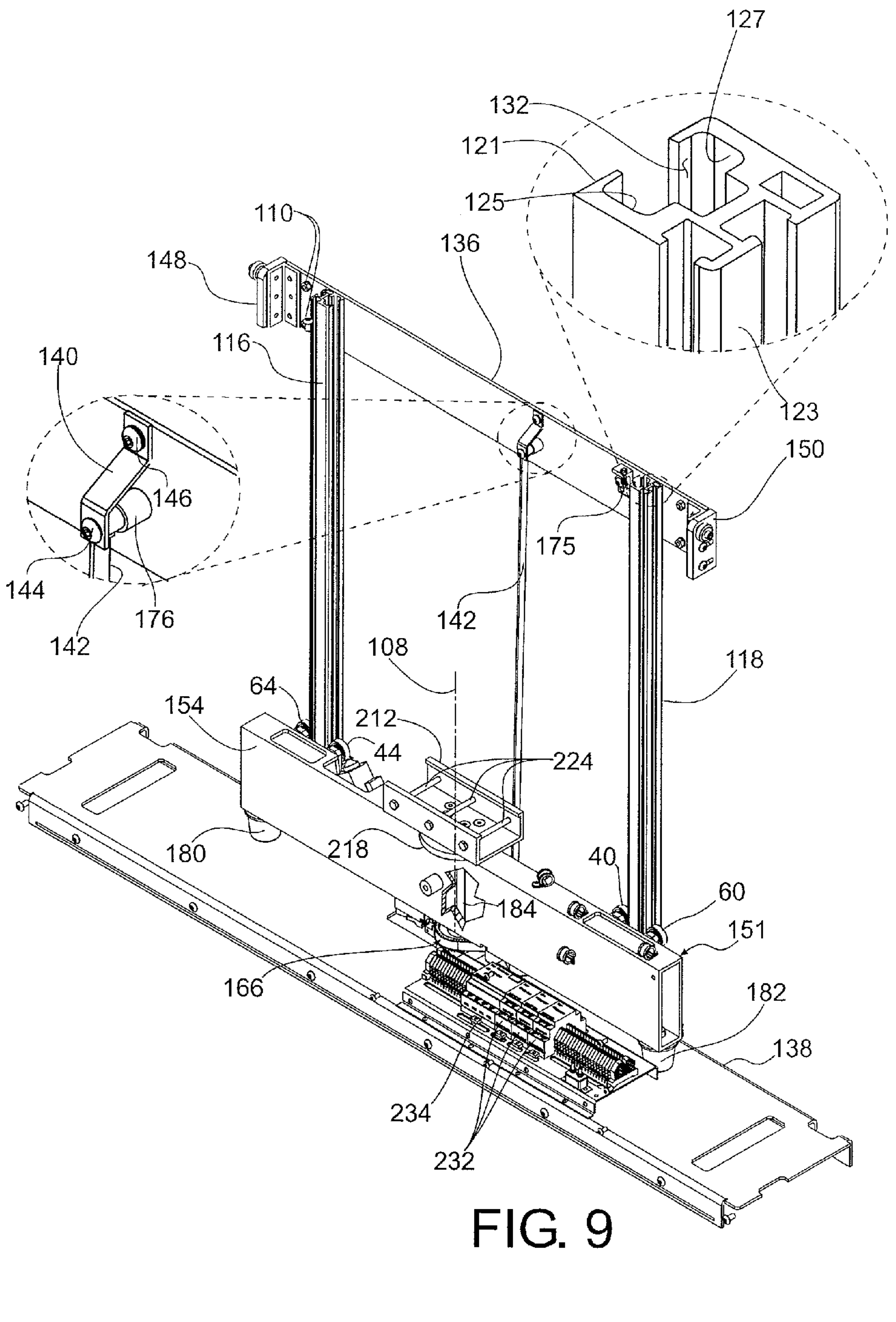
FIG. 9 is a perspective view of the reverse side of the liftable rotation mounting assembly of FIGS. 7 and 8 installed on a guide rail assembly.
Figure 10:
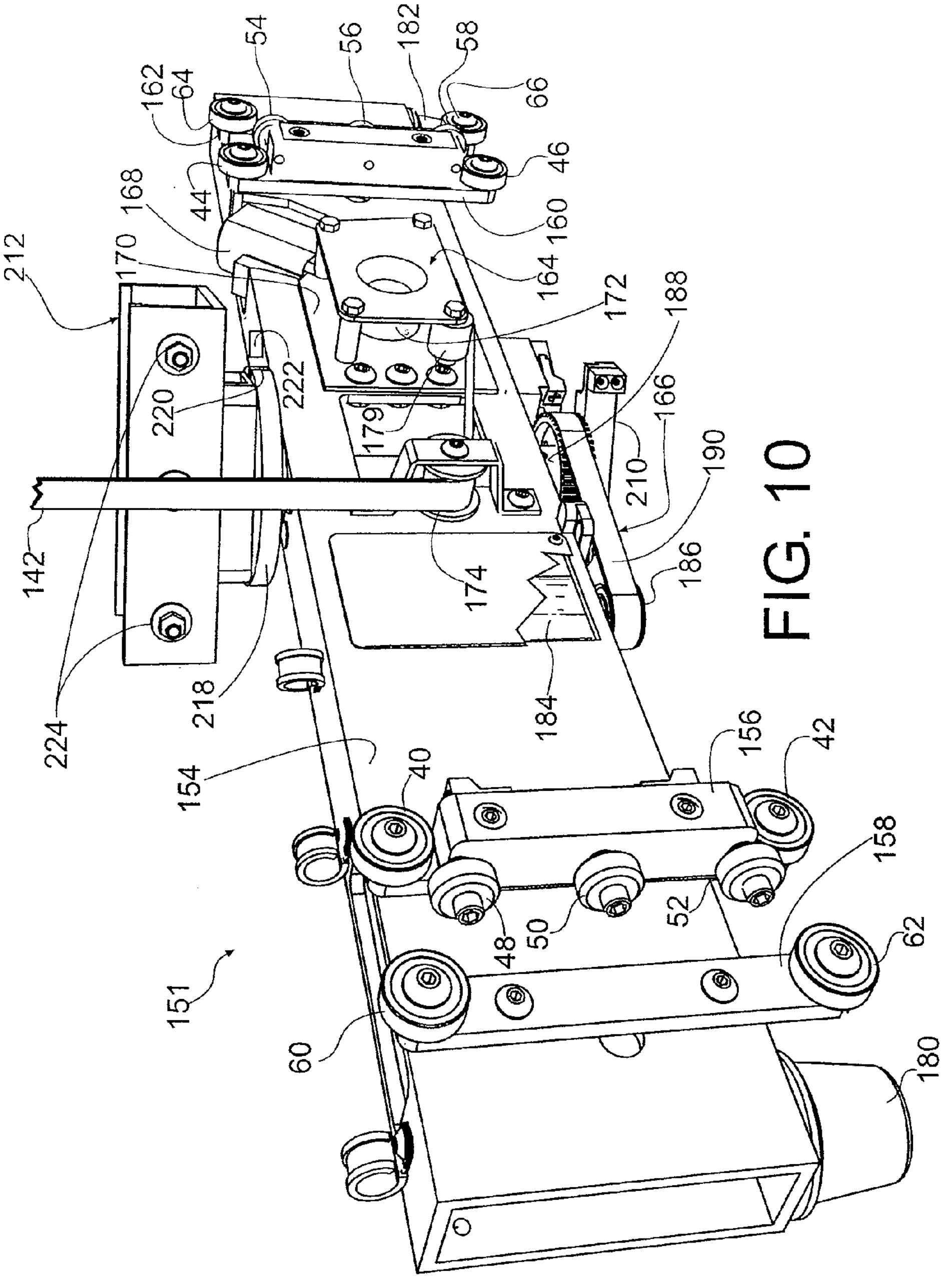
FIG. 10 is an enlarged perspective view of the liftable rotation mounting assembly of FIGS. 7-9.

Referring now primarily to FIGS. 9 and 10, with continuing secondary reference to FIGS. 7 and 8, a cross beam 136 is mounted on the upper ends of the guide rails 116, 118 and serves to stabilize and hold the guide rails 116, 118 in parallel, immovable relation to each other as well as to anchor the lift strap 142, which supports the weight of the liftable rotation assembly 151 and traffic control board 106 as they are being lifted, deployed, and lowered. Therefore, the liftable rotation assembly 151 is essentially suspended from the cross beam 136 by the lift strap 142 when it is being lifted, deployed, and lowered. A pair of bumpers or feet 180, 182 are provided on the bottom of the liftable rotation assembly 151 to support it and the traffic control board 106 on the base panel 138 when they are lowered to their nested or stowed position in the housing 104.

The cross beam 136 can also be attached to a side, front, or rear panel of the housing 104 for further stability, or, in implementations that do not include a housing 104, it can be attached directly to the truck body 28 or other solid structure of the emergency vehicle 10. The traffic control board 106 is mounted on, and supported by, the bracket 212 on top of the liftable rotation assembly 151, as shown in FIG. 7. It can be fastened in the mounting bracket 212 in any convenient manner, for example, with one or more bolts 224. The mounting bracket 212, thus also the traffic control board 106, can be made to rotate by the display rotation mechanism 166 in the liftable rotation assembly 151, as will be described in more detail below.

As mentioned above, the liftable rotation assembly 151 and the traffic control board 106 are supported by, actually suspended on, the lift strap 142, when they are being lifted, deployed, or lowered. As shown in FIG. 10, the lower end of the lift strap 142 is connected to a reel 172, which is part of the lift mechanism 164 of the liftable rotation assembly 151. A lift motor 168, also a part of the lift mechanism 164, is connected via an appropriate gear reduction drive 170 to the reel 172 so that activation of the lift motor 168 to turn in one direction turns the reel 172 to wind the lift strap 142 onto the reel 172 and actuation of the left motor 168 in the reverse direction unwinds the lift strap 142 from the reel 172. The actual gears in the gear reduction drive 170 cannot be seen in FIG. 10, but persons skilled in the art know how they are assembled, and such gear reduction drives are readily available commercially, so no further or elaborate description is required here.

Winding of the lift strap 142 onto the reel 172 causes the liftable rotation assembly 151 to climb up the lift strap 142 and thereby to lift the traffic control board 106 in relation to the guide rails 116, 118 and in relation to the housing 104. Of course, actuating the lift motor 168 to turn in the opposite (reverse) direction turns the reel 172 to unwind the lift strap 142 from the reel 142 and thereby lowers the liftable rotation assembly 151 and traffic control board 106 back into the housing 104.

While various configurations of this kind of lift mechanism can be used, the example shown in FIG. 10 includes several directional idler rollers 174, 179 to facilitate convenient placement of the reel 172 and lift motor 168 in the liftable rotation assembly 151 while guiding the lift strap 142 to and from the reel 172. The upper end of the lift strap 142 can be attached in any convenient manner to the cross beam 136, but the example shown in FIG. 9 includes a bracket 140 to support an anchor bolt 144, to which the upper end 176 of the lift strap 142 is connected. The anchor bolt 144 in this example also extends into or through the cross beam 136. The bracket 140 can be fastened to the cross beam 136 in any convenient manner, for example, with a bolt 146, welding, or other attachment device or method.

Figure 11:
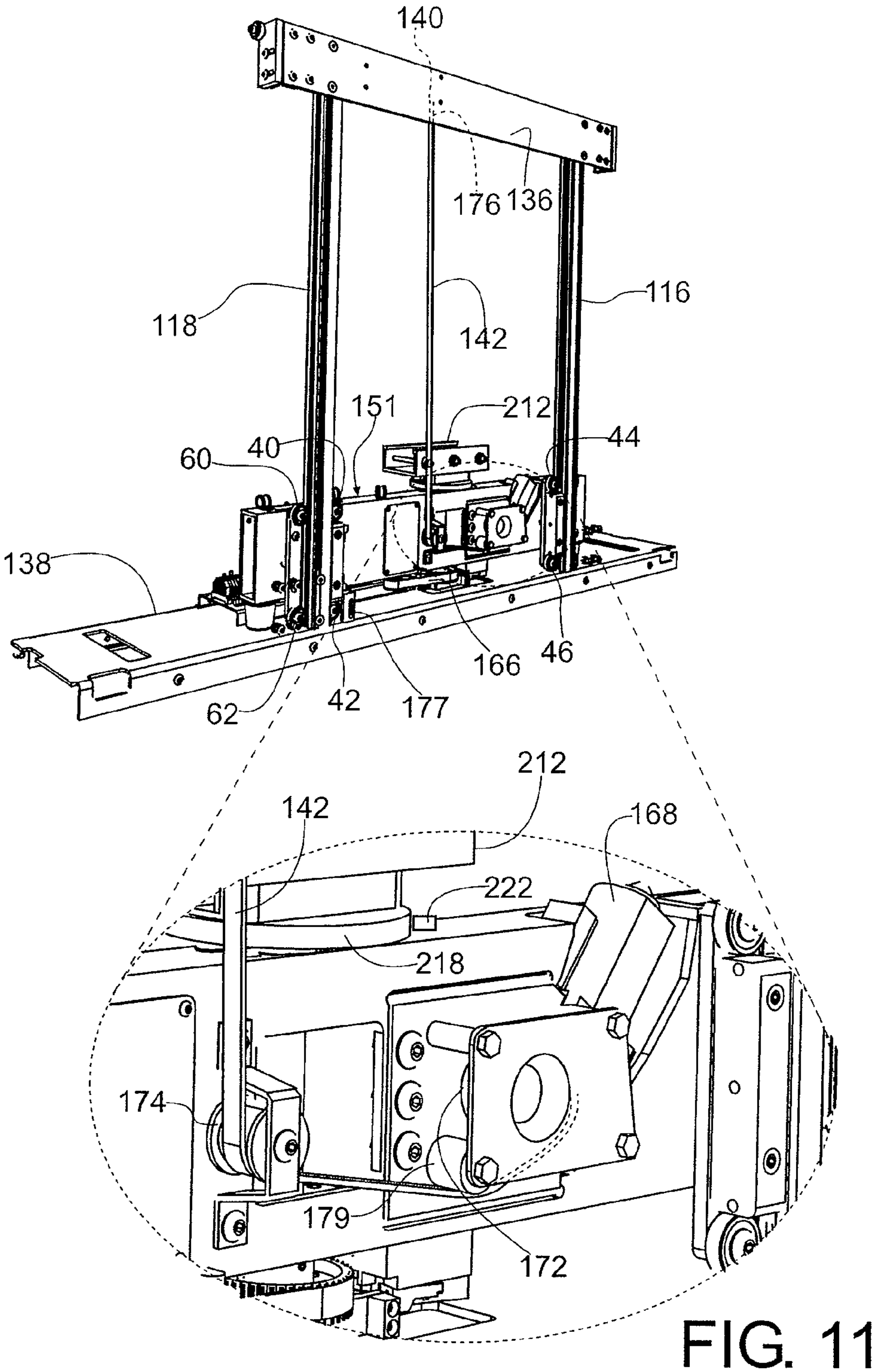
FIG. 11 is a perspective view of the opposite side of the interior components, including the liftable rotation assembly as it is slidably mounted on the guide rail assembly.

As mentioned above, the guide rails 116, 118 provide lateral stability to the liftable rotation assembly 151 as it moves up and down to raise and lower the traffic control board 106 out of and into the housing 104. To provide such lateral constraint to the liftable rotation assembly 151, while allowing it to move freely up and down, a pair of guide runners 156, 158 and 160, 162 (FIG. 10) are mounted at or adjacent opposite ends, respectively, of the liftable rotation assembly 151 to capture the guide rails 116, 118 in a longitudinally slidable or glidable, but laterally immovable, manner, as shown, for example, in FIG. 9. To further facilitate the gliding relationship and prevent binding or unnecessary friction between the runners 156, 158, 160, 162 and the guide rails 116, 118, one or more roller sets or bearings can be mounted on the runners to bear on the guide rails. For example, as shown in FIGS. 9-11, rollers 40, 42 and 44, 46 can be mounted in one lateral direction on the inner runners 156, 160, respectively, to bear on one lateral surface of the respective guide rails 118, 116, and rollers 48, 50, 52 and 54, 56, 58 can be mounted in a perpendicular lateral direction on the inner runners 156, 160, respectively, to bear on perpendicular lateral surfaces of the guide rails 118, 116, respectively. Similarly, rollers 60, 62 and 64, 66 are mounted on outer runners 158, 160, respectively, to bear on another lateral surface of the guide rails 118, 116, respectively.

While any of a variety of guide rail and runner configurations and arrangements, with or without rollers, can be used to provide the slidable or glidable, but laterally immovable, stability for the liftable rotation assembly 151 as described above, the example shown in FIGS. 9-11 utilizes shaped, elongated extrusions for the guide rails 116, 118, as best seen in FIG. 9. To avoid unnecessary repetition, the relationship between the runner rollers and guide rails will be described with reference to one side of the liftable rotation assembly 151 only (e.g., guide rail 118 and runners 156, 158), with the understanding that the same principles and relationships apply to the other side of the liftable rotation assembly 151 as well (e.g., guide rails 116 and runners 160, 162). In this example, referring primarily to FIGS. 9 and 10, the rollers 40, 42 of inner runner 156 and the rollers 60, 62 of the outer runner 158 bear, respectively, on opposite exterior surfaces 121, 123 of the guide rail 118 to prevent lateral movement of the liftable rotation assembly 151 either toward or away from the rail 118 in the lateral direction faced by those surfaces 121, 123. Also, in this example, the perpendicularly mounted rollers 48, 50, 52 of the inner runner 156 are inserted into, and captured by opposing interior surfaces 125, 127 of, a channel 132 in the guide rail 118. Those interior surfaces are perpendicular to the exterior surfaces 121, 123, so they, in combination with the rollers 48, 50, 52, prevent lateral movement of the liftable rotation assembly 151 perpendicular to the lateral direction in which movement is prevented by the rollers 40, 42 and 60, 62 as described above. Consequently, the liftable rotation device 151 can move freely and smoothly up and down, but it is prevented by the guide rails 116, 118 from lateral movement in any direction.

It is appropriate to mention here that, while the example liftable rotation assembly 151 shown in FIGS. 7-10 includes the lift mechanism 164 with the liftable rotation assembly suspended on the lift strap 142, so that winding and unwinding the lift strap 142 on and off the reel 172 to raise and lower the liftable rotation assembly 151 and traffic control board 106, other kinds of lift mechanisms could also be used. For example, a conventional scissors-type of jack or lift (not shown) or a cable winch (not shown), such as those well known to persons skilled in the art, could be used for this purpose, although other problems may be encountered with their use (e.g., uneven or unbalanced lifting, binding, control, and other issues, such as not compact enough, space utilization, and the like).

Figure 12:
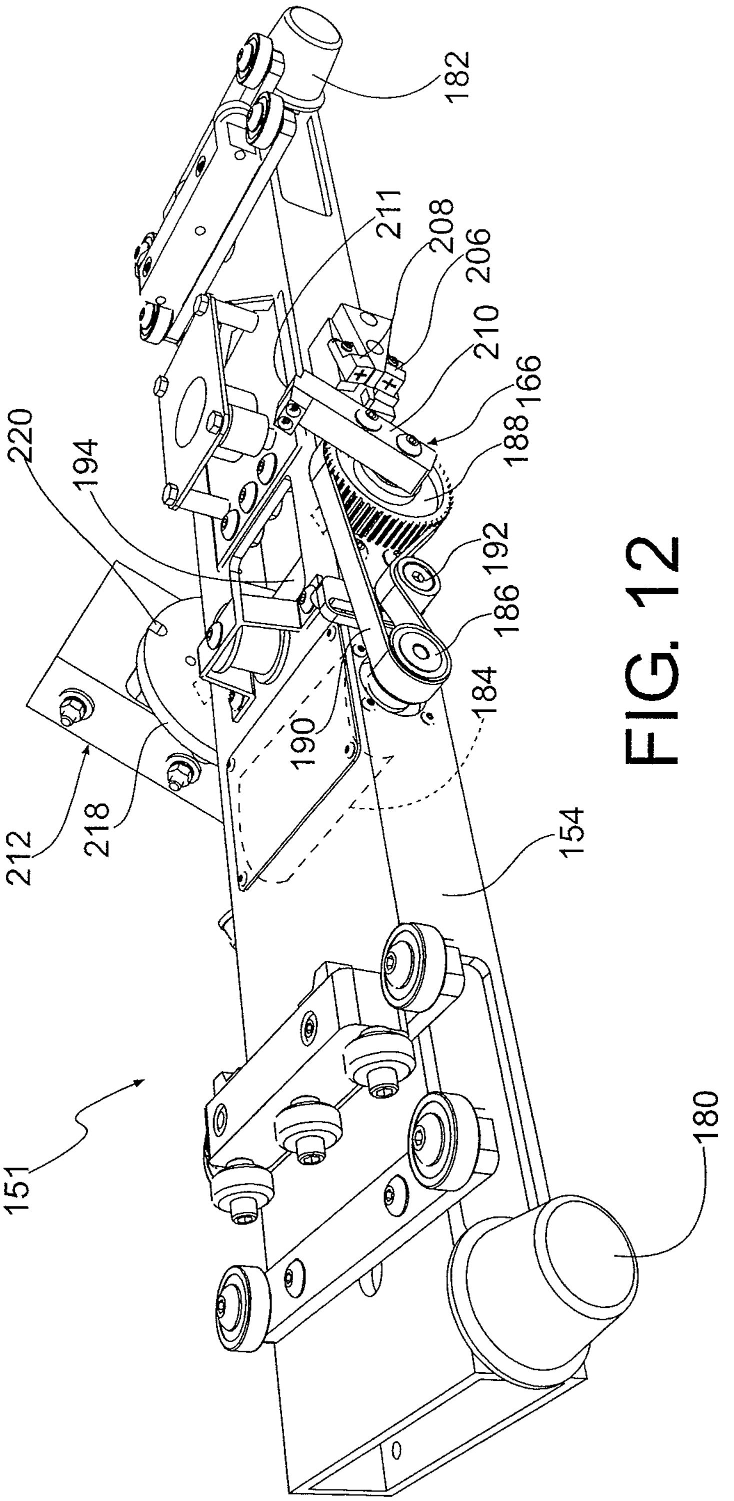
FIG. 12 is an enlarged perspective view of the liftable and rotatable mounting assembly from a perspective looking upwardly at the bottom rear of the assembly to show more of the rotation mechanism, lift actuator, and guide rollers.

As mentioned above, the liftable rotation assembly 151 includes a display rotation mechanism 166 connected to the display panel mounting bracket 212 for rotating the mounting bracket 212, thus also the traffic control board 106, which is mounted on the bracket 212. The example display rotation mechanism 166 in the example liftable rotation assembly 151 is best seen in FIGS. 9-12, although other rotational drive apparatus and configurations could also be used. Referring primarily to FIGS. 10 and 12, with secondary reference to FIG. 9, a vertical main shaft 194 (FIG. 12) connects the display panel mounting bracket 212 to a toothed pulley or sprocket 188, which is rotatably mounted on the bottom of the elongated frame 154 of the liftable rotation assembly 151. The sprocket 188 is driven to rotate by a rotation motor 184, and rotation of the driven sprocket 188 rotates the main shaft 194 and the traffic control board mounting bracket 212. A toothed drive pulley or sprocket 186 mounted on the drive motor 184 transfers rotational motion of the motor 184 via the toothed drive belt 190 to the driven sprocket 188. An idler roller 192 can be used to maintain tightness of the belt 190. Activation of the rotation motor 184 to rotate causes the driven sprocket 188 to rotate, thus rotating the main shaft 194, mounting bracket 212, and traffic control board 106 to rotate in relation to the housing 104, as indicated by the arrow 107 in FIGS. 3, 6, and 8. The mounting bracket 212 also has a circular plate 218 with a center location notch 220 in its peripheral surface for interacting with a center sensor 222 (FIGS. 10 and 11) to detect when the mounting bracket 212 and the traffic control board 106 are rotated to a center position, where they are aligned with the top opening of the housing 104 so that they can be lowered into the housing 104 for stowage, as described above.

Directional rotation and limit sensors 206, 208, best seen in FIG. 12, can be provided to monitor the direction that the main shaft 194 and mounting bracket 212 have rotated after leaving the center position 220 described above, and they can serve as rotation limit sensors. Of course, when the traffic control board 106 (not shown in FIG. 12) is mounted in the bracket 212, these sensors 206, 208 also indicate the direction that the traffic control board has rotated. Essentially, in the example shown in FIG. 12, when the bracket 212 (and traffic control board 106) are in the center position, i.e., the center location notch 220 is aligned with the center sensor 222, as described above, the distal end 211 of a position arm 210, which is attached to the sprocket 188, is positioned between the two sensors 206, 208. Then, in this example, when the rotation motor 184 is actuated to rotate the main shaft 194, bracket 212, and traffic control board 106, one of the two sensors 206, 208 will be the last to sense the distal end of the position arm 210, thus being indicative of the direction the sprocket 188 and bracket 212 are rotating. If the position arm 210 continues to rotate far enough to then be detected by the other one of the sensors 206, 208, that detection is indicative that the main shaft 194, bracket 212, and traffic control board 106 have rotated nearly 360 degrees, which, in this example, is a practical limit, so the rotation motor 184 is stopped. In this example, rotation more than 360 degrees could strain or break wires (not shown) leading to the traffic control board 106, although rotatable electrical connectors could be used if rotation of the traffic control board 106 more than 360 degrees is needed for some applications. The signals from the center sensor 222 and from the directional rotation and limit sensors 206, 208 are transmitted to an electronic controller 234 (best seen in FIG. 9) for processing and control purposes, as will be described in more detail below. The rotation motor 184 can be a stepper motor or other position controllable motor so that rotation and positioning of the traffic control board 106 is controllable with precision and reliability.

An upper limit switch 175 (FIG. 9) senses when the liftable rotation assembly 151 has raised high enough for the traffic control board 104 to clear the housing 104 and/or the top surface of the truck body 28 so that it can be rotated, as described above. When that upper limit switch 175 senses that the liftable rotation assembly 151 reaches that upper limit position, an upper limit signal is sent to the electronic controller 234 (FIG. 9), which responds by stopping the lift motor 168 and removing a logic block or prohibition that up to that time has prevented the rotation motor 184 from operating to rotate the traffic control board as described above.

As also described above, when the center sensor 222 (FIGS. 10 and 11) provides a signal to the electronic controller 234 indicating that the traffic control board 106 is in the centered position, the electronic controller 234 can remove a logic block or prohibition that prevented operation of the lift motor 168 in order to then lower the liftable rotation assembly 151 and traffic control board 106 into the housing 104. A lower limit switch 177 (FIG. 11) senses when the liftable rotation assembly 151 and traffic control board 106 have been lowered all the way down to the nesting or stowage position in the housing 104 and provides a signal to the electronic controller 234, which responds by shutting off the lift motor 168. The sensor and control components shown and described herein are examples, and persons skilled in the art will understand that the functions described herein can also be implemented in myriad other ways.

Figure 13:
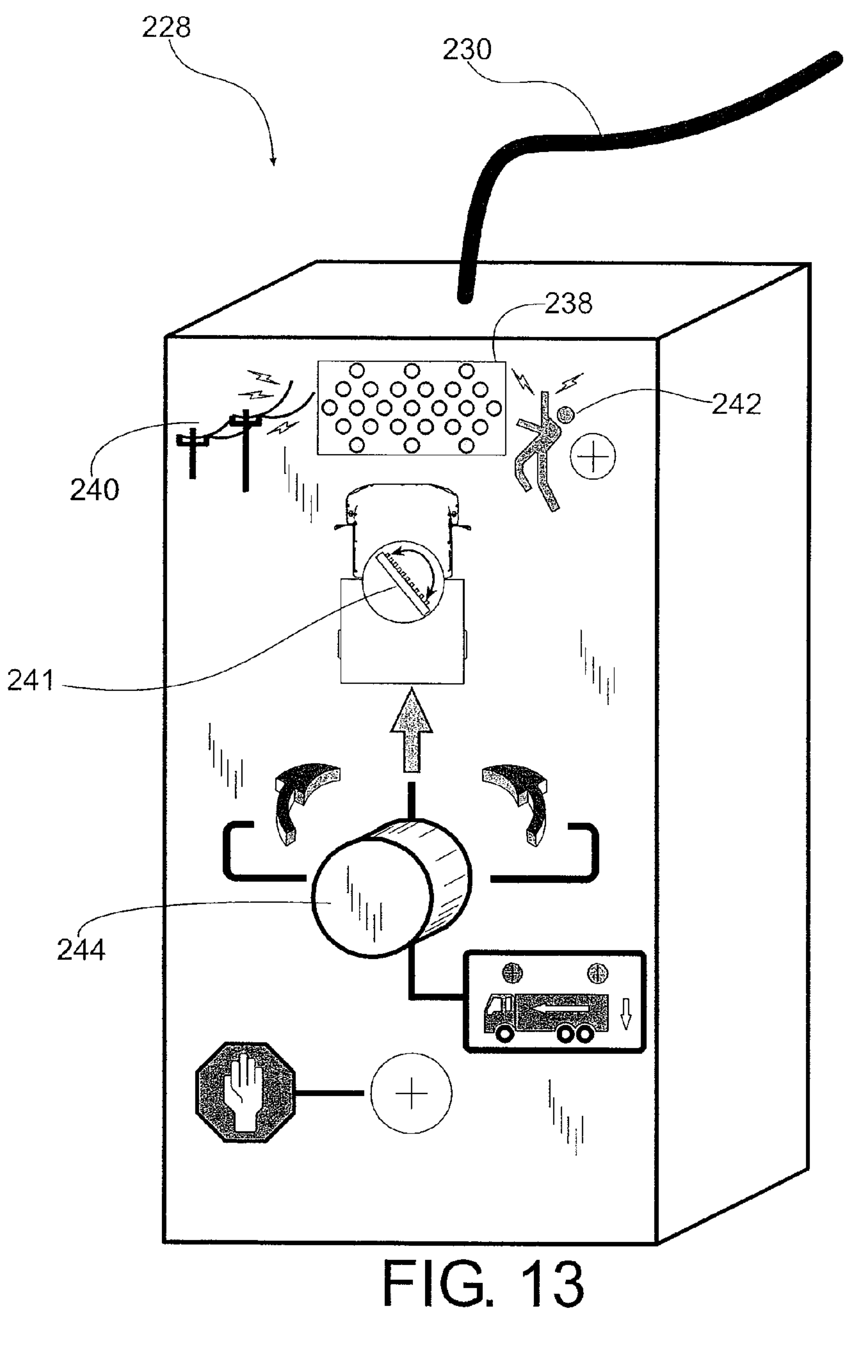
FIG. 13 is an isometric view of an example handheld controller for interfacing with and operating the traffic control board assembly.

In an example implementation, a handheld control box 228 shown in FIG. 13 can be provided as a user interface. The control box 228 can be connected to the electronic controller 234 (FIG. 9) by wires 230 or wirelessly, such as by infrared (IR) or radio frequency (RF) communications, as is understood by persons skilled in the art. An operator or user can be provided with a variety of control features, as desired. For example, a display panel 238 on the control box 228 can duplicate the light display on the traffic control board 106 (FIG. 1), so that the operator can see on the control box 228 the message or light configuration that is displayed on the traffic control board 106. Another example display 241 can show the current rotated position of the traffic control board 104 in relation to the emergency vehicle. The control 228 can also include, for example, a power line symbol 240 and/or a human shock symbol 242 as a reminder to the operator to check for power lines or other obstacles before deploying the traffic control board 106.

The example control box 228 in FIG. 13 is shown with a joystick 244 for controlling the movement of the traffic control board 106, although other control knobs, buttons, keyboard switches, touch pads, etc., could be used instead. Manipulation of the joystick 244 can send signals to the electronic controller 234 (FIG. 9) to, for example, raise and lower the traffic control board 106 (FIG. 1), as described above, and to rotate the traffic control board 106 in either direction after it has been raised out of the housing 104. The electronic controller 234 can use signals from the center sensor 222 (FIG. 10) to prevent the operator from rotating the traffic control board 106 until it has been raised completely out of the housing 104, as described above. The electronic controller 234, functioning according to a programmed set of instructions, for example in firmware or software, sends signals to relays 232 (FIG. 9) to activate the lift motor 168, rotation motor 184, or other components to activate the functions of the traffic control board assembly 100.

The actual display on the traffic control board can be created and/or input by the control box 228 or from a different input source (not shown). For example, but not for limitation, a variety of standard traffic control displays (e.g., left arrow, right arrow, “MERGE”, “SLOW”, “CAUTION”, flashing, non-flashing, etc.) can be programmed into the electronic controller 234 or into an auxiliary to the electronic controller 234, so they can be selected by a menu or by toggling an input with the joystick 244 or other input interface. As another implementation, the traffic control board 106 can include an electronic message board or system comprising a liquid crystal display (LCD) panel, plasma display panel, light-emitting diode (LED) display panel, or other electronic display system on which text messages and/or images generated by computer or processors can be displayed. Such display panels or systems are well-known and readily available commercially from myriad manufacturers or sources, for example, Trans-Lux Corporation of Norwalk, Conn., Tickermedia of Plano, Tex., and many others. Therefore the variety of text messages and/or images that can be displayed on the traffic control board 106 is virtually unlimited.

Figure 14A:
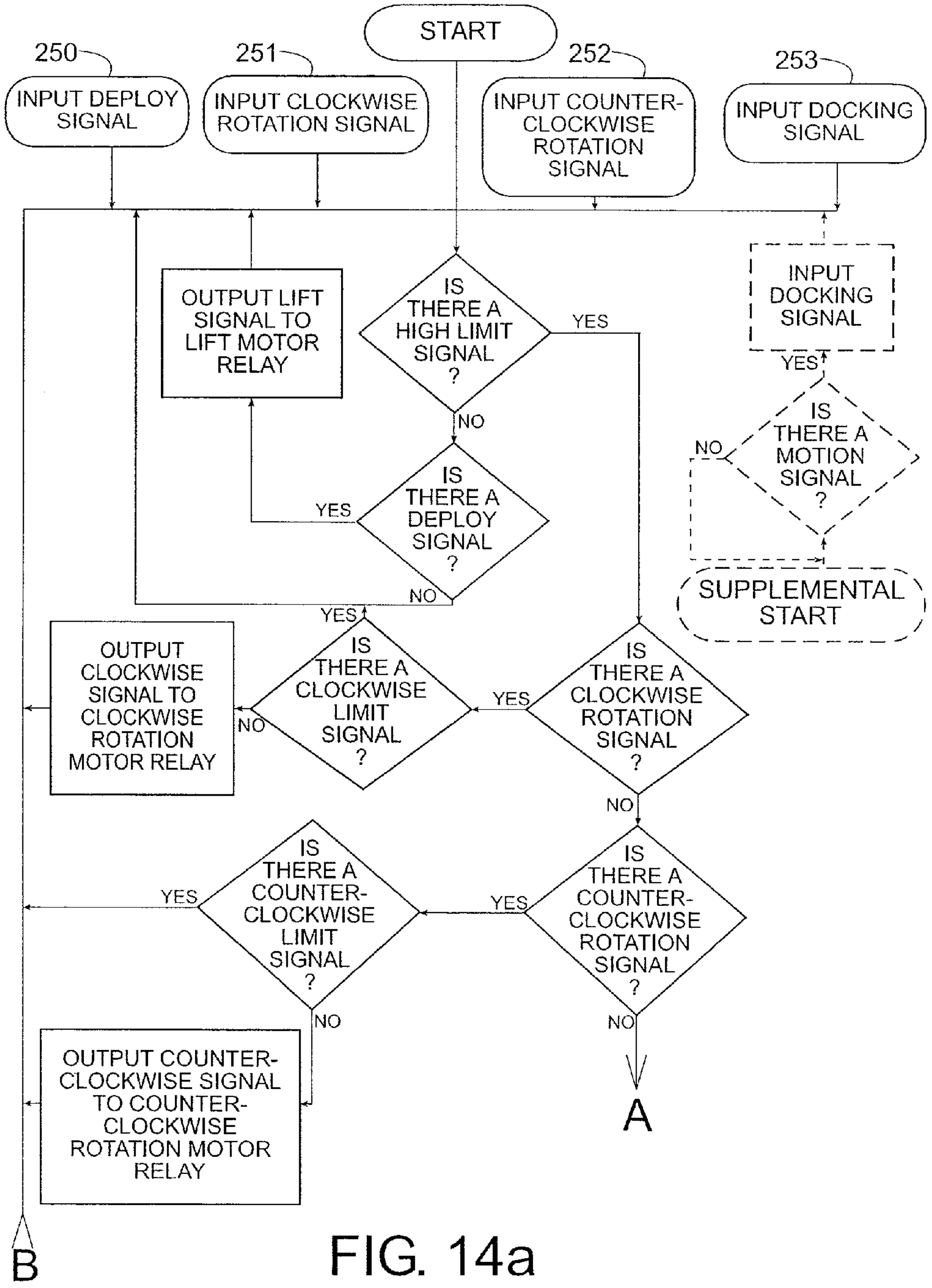
FIGS. 14*a-b* show an example logic diagram for an example method of operating the traffic control board assembly.
Figure 14B:
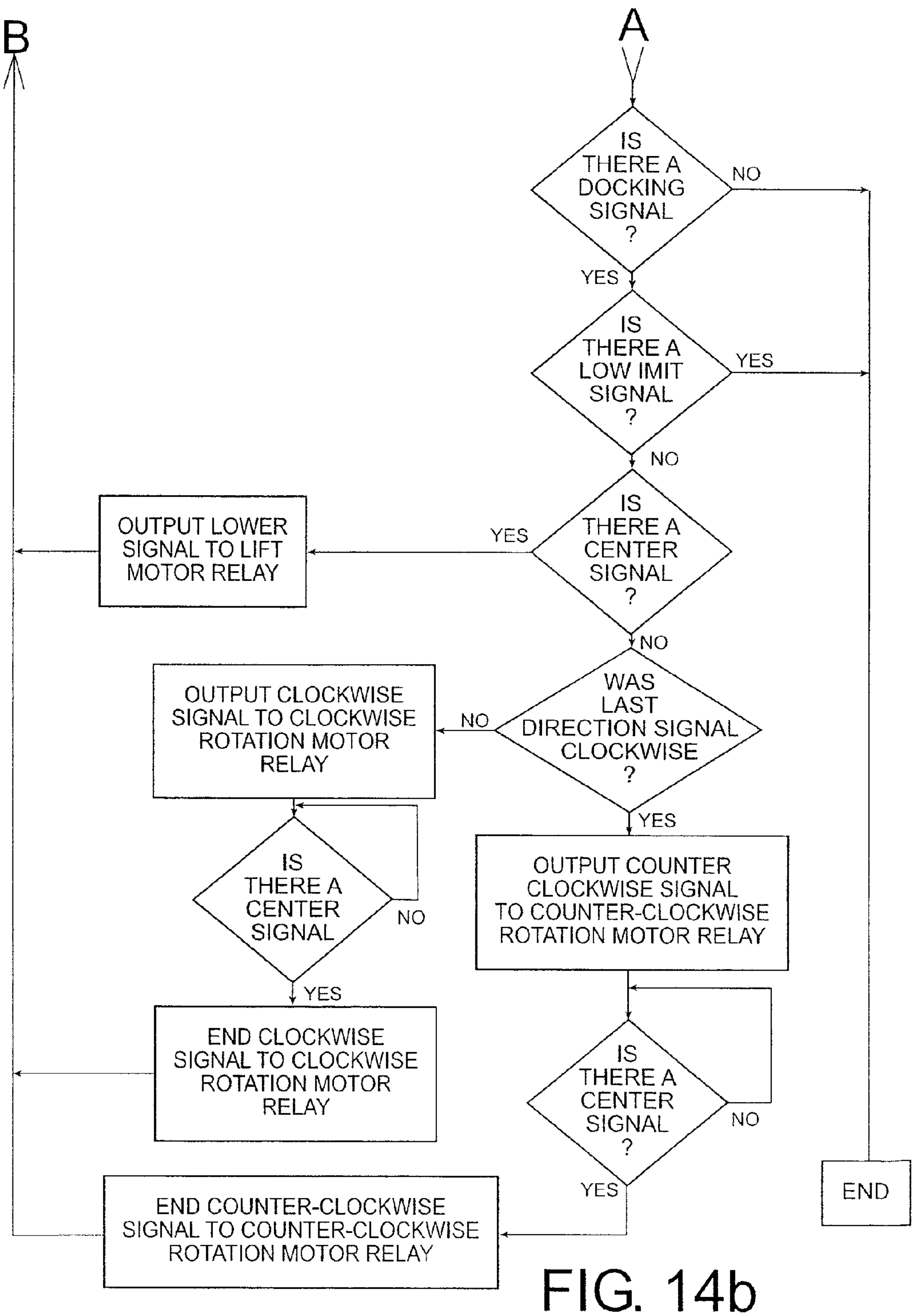

Persons skilled in the art are capable of developing a variety of software programs to implement the functions described above. The logic diagram in FIGS. 14*a* and 14*b* shows one example basis for a control program. In FIG. 14*a*, any of the inputs 250, 251, 252, and 253 can be generated manually, for example, with the joystick 244 or other signal generating device, as is within the capabilities of persons skilled in the art, once they understand the principles, functions, and features described herein. Any one or more of the example inputs 250, 251, 252, or 253 can also be generated automatically. For example, but not for limitation, a motion detector, such as the motion detector 248 illustrated diagrammatically in FIG. 4, can generate a signal to indicate when the emergency response vehicle is moving, and such motion signal can be used to provide the docking input 253 in FIG. 14*a* so that the traffic control board 106 is made to automatically return to its docked or stowed position in the housing 104 when the vehicle 10 moves. An example logic to accommodate such an optional motion monitoring and docking signal input is shown in broken lines in FIG. 14*a*. Although not shown in FIG. 14*a*, the logic may also include a test for a signal from the motion detector 248, and if there is a motion signal, to prevent the inputs 250 (deploy), 251 (clockwise rotation), or 252 (counterclockwise rotation) from initiating their respective actions when the vehicle 10 is moving. There can also be a test (not shown in FIG. 14*a*) to put a speed threshold, for example, but not for limitation, 5 miles per hour (8 km/hr), on the motion signal so that it does not automatically input a docking signal or prevent deployment unless the vehicle 10 is moving faster than the threshold. Persons skilled in the art know how to program these and other options or alternatives.

Figure 15:
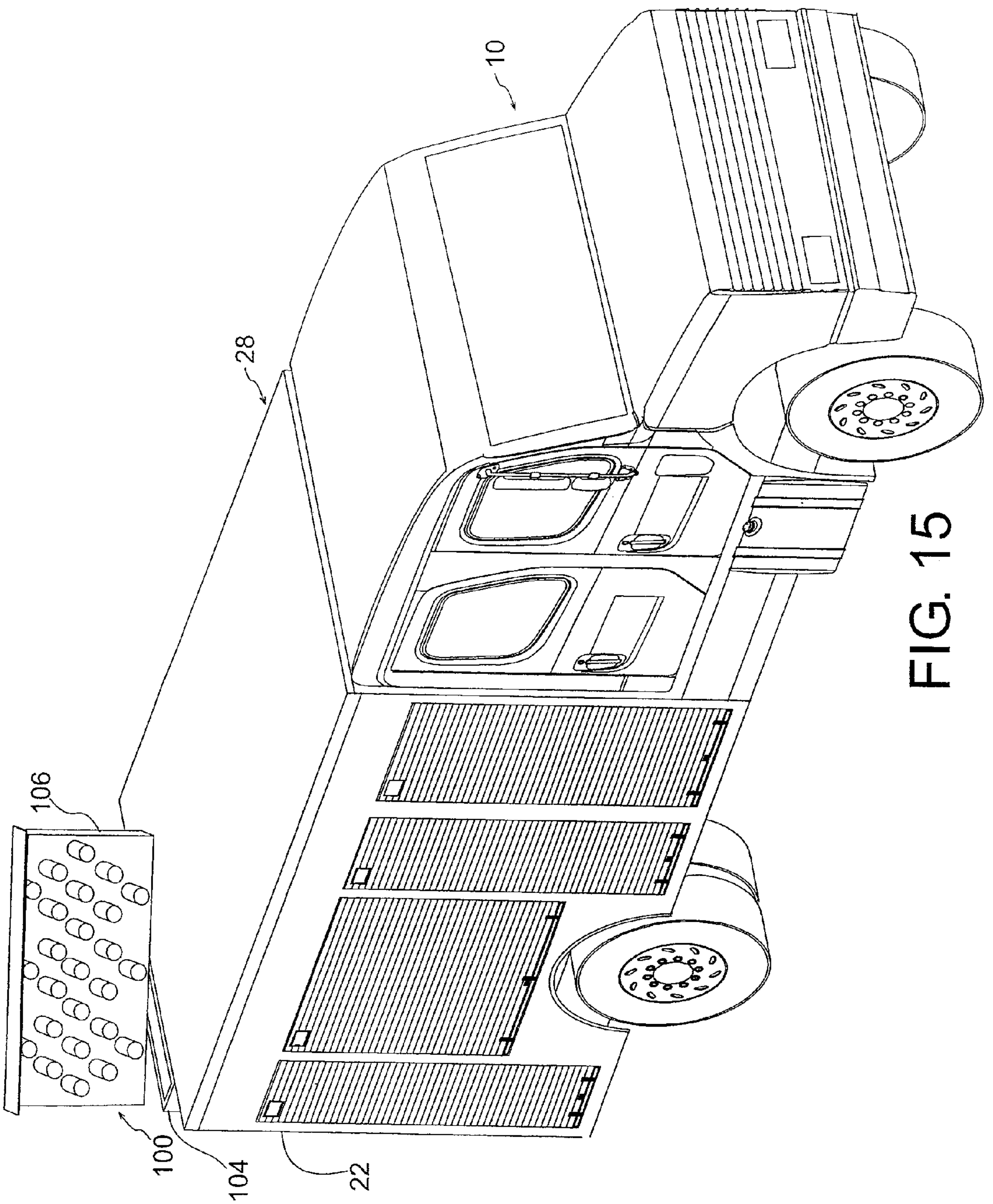
FIG. 15 is a rear perspective view of an emergency response vehicle illustrating the traffic control board assembly mounted on the back surface of the truck body.

As mentioned above, the traffic control board assembly 100 can be mounted in a variety of locations in, on, or adjacent the truck body 26. Several example alternate locations 100', 100" in the truck body 28 are illustrated in broken lines in FIG. 3. Another example in FIG. 15 shows the traffic control board assembly 100 mounted on the back surface 22 of the truck body 26. Also, in situations wherein the traffic control board assembly is mounted inside the truck body 26, for example, in the location 100' or 100" (FIG. 3), the housing 104 may not be necessary. Therefore, optionally, the base panel 138 and cross beam 136 can be mounted to solid structures of the truck body 26, e.g., to the floor or a platform and a wall, without the housing 104, and an appropriate opening can be made in the roof of the truck body 26 to accommodate the traffic control board raising and lowering. The cover panel 30 can then seal to the roof around the opening to keep out rain, snow, and dust when the traffic control board 106 is not deployed.

The details, components, and structures described above are examples of implementations of the invention, but other structures and components could also be used to implement the invention, which comprises a traffic control assembly adapted for mounting on an emergency vehicle. Other features of the invention can be discerned from the description above and the accompanying drawings in FIGS. 1-15, which form a part of this description.

The foregoing description is considered as illustrative of the principles of the invention. Furthermore, since numerous modifications and changes will readily occur to those skilled in art, it is not desired to limit the invention to the exact construction and process shown and described above. Accordingly, resort can be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The invention claimed is:

1. Traffic control board apparatus comprising:

an enclosure housing a liftable rotation assembly and a traffic control board, the traffic control board comprising visual signal forming devices mounted on the liftable rotation assembly, wherein the liftable rotation assembly includes:

a vertical lift mechanism that raises and lowers the liftable rotation assembly upwardly and downwardly in the enclosure to move the traffic control board vertically out of and into the enclosure;

a rotation mechanism that rotates the traffic control board about a vertical axis to selectable angular orientations with respect to the housing only when the liftable rotation assembly has lifted the traffic control board entirely out of the housing; and a high limit signal device that produces a high limit signal when the liftable rotation assembly is raised to an upper limit, a center position signal device that produces a center position signal when the traffic control board is in a center rotation position in which it can be lowered into the enclosure, and a low limit signal device that produces a low limit signal when the liftable rotation assembly is lowered to a docked storage position in the enclosure; and wherein the traffic control board apparatus also includes an electronic controller programmed to receive and process the high limit signals, the center position signals, and the low limit signals to determine, respectively, whether the traffic control board is out of the enclosure, whether the traffic control board is in the center rotation position, and whether the liftable rotation assembly is in the docked storage position.

2. The traffic control board of claim 1, including a cover panel on the top of the traffic control board that is sized and shaped to close the top of the enclosure when the traffic control board is lowered by the liftable rotation assembly to the docked storage position in the enclosure.

3. The traffic control board apparatus of claim 1, wherein the liftable rotation assembly is suspended on a lift strap from a cross beam supported by two parallel, vertical guide rails in the enclosure, and wherein the vertical lift mechanism includes a reel driven by a lift motor and connected to the lift strap such that actuation of the lift motor to rotate in one direction rotates the reel to wind the lift strap onto the reel, which causes the liftable rotation assembly to climb up the lift strap and thereby raise the traffic control board, and actuation of the lift motor to rotate in the opposite direction drives the reel to unwind the lift strap and thereby lower the traffic control board.

4. The traffic control board apparatus of claim 3, including guide runners on opposite ends of the liftable rotation assembly that capture the guide rails to constrain lateral movements, while allowing vertical movement, of the liftable rotation assembly in relation to the guide rails.

5. The traffic control board apparatus of claim 1, including:

a manual control device by which an operator can input deploy, clockwise, counterclockwise, and docking signals; and wherein the electronic controller is programmed to receive the deploy, clockwise rotation, counterclockwise rotation, and docking signals, and: (i) in response to the deploy signals, to output lift signals to the vertical lift mechanism to raise the liftable rotation assembly to raise the traffic control board out of the enclosure if it is not already out of the enclosure; (ii) in response to the clockwise rotation signals, to output clockwise rotation signals to the rotation mechanism to rotate the traffic control board clockwise if the traffic control board is out of the enclosure; (iii) in response to the counterclockwise rotation signals, to output counterclockwise signals to the rotation mechanism to rotate the traffic control board counterclockwise if the traffic control board is out of the enclosure; and (iv) in response to the docking signals, to output lower signals to the vertical lift mechanism to lower the liftable rotation assembly and the traffic control board if the traffic control board is already in a center position and the liftable rotation assembly is not already docked.

6. The traffic control board apparatus of claim 5, including:

a clockwise rotation limit signal device that produces clockwise rotation limit signals when the traffic control board is rotated to a clockwise rotation limit, and a counterclockwise rotation limit signal device that produces counterclockwise rotation limit signals when the traffic control board is rotated to a counterclockwise rotation limit; and the electronic controller being programmed to receive the clockwise limit signals and the counterclockwise limit signals, and to use the clockwise limit signals and the counterclockwise limit signals to determine, respectively, whether the traffic control board has been rotated to the clockwise limit and whether the traffic control board has been rotated to the counterclockwise limit.

7. Traffic control board apparatus for mounting in a truck body comprising:

a vertical lift mechanism that raises and lowers a liftable rotation assembly that supports a traffic control board upwardly and downwardly to move the traffic control board vertically out of and into the truck body;

a rotation mechanism in the liftable rotation assembly that rotates the traffic control board about a vertical axis to selectable angular orientations with respect to the truck body only when the liftable rotation assembly has lifted the traffic control board entirely above the truck body;

a high limit signal device that produces a high limit signal when the liftable rotation assembly is raised to an upper limit, a center position signal device that produces a center position signal when the traffic control board is in a center rotation position in which it can be lowered into the truck body, and a low limit signal device that produces a low limit signal when the liftable rotation assembly is lowered to a docked storage position in the truck body; and an electronic controller programmed to receive and process the high limit signals, the center position signals, and the low limit signals to determine, respectively, whether the traffic control board is out of the truck body, whether the traffic control board is in the center rotation position, and whether the liftable rotation assembly is in the docked storage position.

8. The traffic control board apparatus of claim 7, including a cover panel on the top of the traffic control board that is sized and shaped to close an opening in the truck body when the traffic control board is lowered by the liftable rotation assembly to the docked storage position in the truck body.

9. The traffic control board apparatus of claim 7, wherein the liftable rotation assembly is suspended on a lift strap from a cross beam supported by two parallel, vertical guide rails extending upwardly from the base panel, and wherein the vertical lift mechanism includes a reel driven by a lift motor and connected to the lift strap such that actuation of the lift motor to rotate in one direction rotates the reel to wind the lift strap onto the real, which causes the liftable rotation assembly to climb up the lift strap and thereby raise the traffic control board, and actuation of the lift motor to rotate in the opposite direction drives the reel to unwind the lift strap and thereby lower the traffic control board.

10. The traffic control board apparatus of claim 9, including guide runners on opposite ends of the liftable rotation assembly that capture the guide rails to constrain lateral movement, while allowing vertical movement, of the liftable rotation assembly in relation to the guide rails.

11. The traffic control board apparatus of claim 7, including:

a manual control device by which an operator can input deploy, clockwise, counterclockwise, and docking signals; and wherein the electronic controller is programmed to receive the deploy, clockwise rotation, counterclockwise rotation, and docking signals, and: (i) in response to deploy signals, to output lift signals to the vertical lift mechanism to raise the liftable rotation assembly to raise the traffic control board out of the truck body if it is not already out of the truck body; (ii) in response to clockwise rotation signals, to output clockwise rotation signals to the rotation mechanism to rotate the traffic control board clockwise if the traffic control board is out of the truck body; (iii) in response to clockwise rotation signals, to output counterclockwise signals to the rotation mechanism to rotate the traffic control board counterclockwise if the traffic control board is out of the truck body; and (iv) in response to docking signals, to output lower signals to the vertical lift mechanism to lower the liftable rotation assembly and the traffic control board if the traffic control board is already in a center position and the liftable rotation assembly is not already docked.

12. The traffic control board apparatus of claim 11, including:

a clockwise rotation limit signal device that produces clockwise rotation limit signals when the traffic control board is rotated to a clockwise rotation limit, and a counterclockwise rotation limit signal device that produces counterclockwise rotation limit signals when the traffic control board is rotated to a counterclockwise rotation limit; and the electronic controller being programmed to receive the clockwise limit signals and the counterclockwise limit signals, and to use the clockwise limit signals and the counterclockwise limit signals to determine, respectively, whether the traffic control board has been rotated to the clockwise limit and whether the traffic control board has been rotated to the counterclockwise limit.

13. The traffic control board apparatus of claim 11, including a motion detector that has the capability of detecting when the emergency response vehicle is moving and outputting a motion signal in response to such motion, and wherein the electronic controller receives such motion signal and is programmed to prevent deployment of the traffic control board when there is such a motion signal.

14. The traffic control board apparatus of claim 13, wherein the electronic controller is programmed to return the traffic control board to the docked storage position in response to the motion signal.

15. The traffic control board apparatus of claim 13, wherein the motion signal is indicative of speed at which the emergency response vehicle moves, and wherein the electronic controller is programmed with a threshold speed and to prevent deployment of the traffic control board when the motion signal is indicative of a speed that meets or exceeds the threshold speed.

16. The traffic control board apparatus of claim 14, wherein the electronic controller is programmed to return the traffic control board to the docked storage position in response to the motion signal being indicative of a speed that meets or exceeds the threshold speed.

* * * * *